Nov. 12, 1935.                H. F. FRUTH                2,020,408
CONDENSER FOIL TERMINAL
Filed Nov. 25, 1933
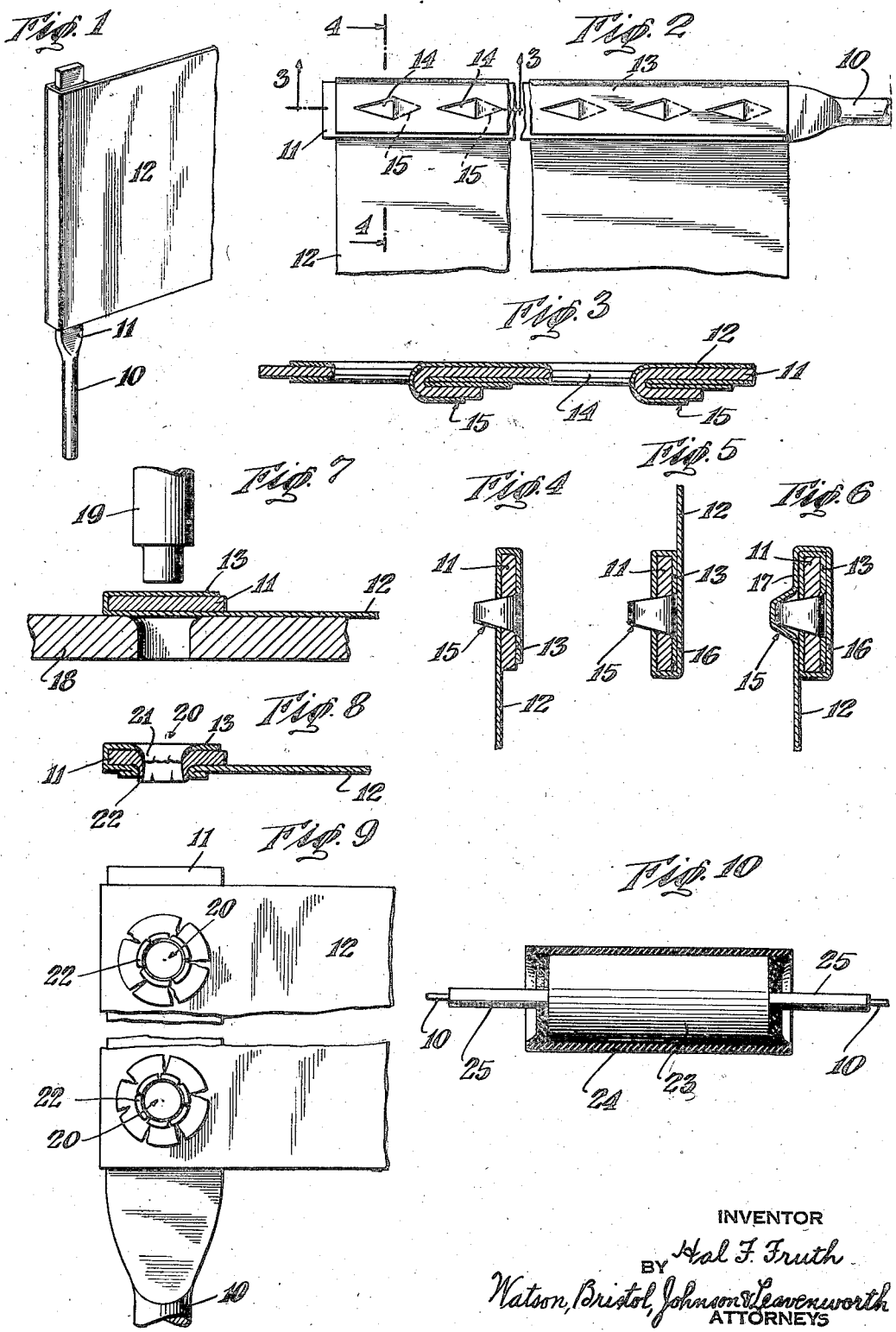
INVENTOR
Hal F. Fruth
BY Watson, Bristol, Johnson & Leavenworth
ATTORNEYS Patented Nov. 12, 1935

2,020,408

UNITED STATES PATENT OFFICE 2,020,408

CONDENSER FOIL TERMINAL

Hal F. Fruth, Indianapolis, Ind., assignor to P. R. Mallory & Co., Incorporated, Indianapolis, Ind., a corporation of Indiana Application November 25, 1933, Serial No. 699,658

14 Claims. (Cl. 175—315)

This invention relates to terminals for electrical condensers of the so-called dry electrolytic type. In the manufacture of such condensers it is customary to use for the plates long, narrow sheets of thin aluminum foil, on at least one of which has been formed a current-blocking film which serves as the dielectric of the condenser. These plates interleaved with spacers impregnated with a suitable electrolyte composition are rolled into condenser sections which are then enclosed in suitable containers. To enable such condensers to be connected in electrical circuits, it has heretofore been the practice to fold one end of each condenser foil diagonally and then fold the folded portion upon itself so as to provide a portion of the foil which extends from one end of the rolled condenser section or to clip the condenser foil in such manner that a portion of it may be folded so as to extend from one end of the rolled condenser. The projecting portion of the foil is in itself too frail to be used for connecting the condenser in an outside electrical circuit and some additional means for making such connection must be provided. This is usually done by connecting the projecting portion of the foil to a terminal lug or lead or binding post, or to a metal container in which the condenser section is enclosed. These methods have been adopted because of difficulties heretofore encountered in securing terminals to the condenser foils within the rolled condenser section themselves. The presence of any different metal in contact with the electrolyte composition gives rise to corrosion difficulties and the presence of the current-blocking film on at least one of the foils may interfere with the making of effective electrical contact. Hence it has been the practice to provide these condensers with a projecting integral part of the condenser foil itself, which insures good electrical connection and freedom from corrosion difficulties, but is too frail for making outside connections.

The object of the present invention is to provide a terminal for the foil of such dry electrolytic condensers which is sufficiently strong to withstand severe handling and to serve for connecting the condensers in outside circuits, which is easily and cheaply affixed to the condenser foil within the rolled condenser section and which when affixed will insure good electrical connection therewith throughout the life of the condenser and which, when desired, can be readily insulated.

Other objects of the invention will in part be obvious and will in part appear hereinafter.

The invention accordingly comprises an article of manufacture possessing the features, properties, and the relation of elements which will be exemplified in the article hereinafter described and the scope of the application of which will be indicated in the claims.

For a fuller understanding of the nature and objects of the invention reference should be had to the following detailed description taken in connection with the accompanying drawing, in which:

Fig. 1 is a perspective view, with parts broken away, of a condenser foil provided with a terminal of the present invention;

Fig. 2 is an enlarged plan view, with parts broken away, of a condenser foil showing one means of securing the foil to the terminal wire and depicting the relative positions of the parts in the first stages of the formation of the terminal;

Fig. 3 is a sectional view taken on line 3—3 of Fig. 2;

Fig. 4 is a sectional view taken on line 4—4 of Fig. 2;

Fig. 5 is a view similar to Fig. 4 depicting the relative positions of the parts in later stages of the formation of the foil terminal;

Fig. 6 is a view of the structure depicted in Figs. 4 and 5 showing the relative positions of the parts after the terminal of the present invention has been completed;

Fig. 7 is a sectional view of a portion of the condenser foil and terminal member associated with dies for securing the terminal member to the foil in accordance with another modification of the present invention;

Fig. 8 is a sectional view of the foil and terminal member depicted in Fig. 7 showing the relative position of parts after operation of the dies;

Fig. 9 is a plan view, with parts broken away, of the condenser foil and terminal member depicted in Fig. 8; and Fig. 10 is a sectional view of a dry electrolytic condenser provided with the terminals of the present invention.

In accordance with the present invention, a terminal is made from aluminum wire of substantially the same metallurgical composition as the aluminum foil and of a sufficient size to withstand the handling incident to the operations performed in the manufacture of the condenser itself and the usage to which the finished condenser will be subjected. One end of this aluminum wire is flattened for a length approximately equal to the width of the condenser foil with which it is to be connected. This flattened portion is then placed on the condenser foil preferably near one end and the foil wrapped around the flattened portion. To insure good mechanical and electrical contact the foil and flattened portion are then punched with suitable tools to insure a direct metal to metal contact between the foil and the flattened end of the terminal. These punchings also serve to make permanent mechanical connection between the two. After the punching operation, it is desirable to wrap the foil for one or two more turns around the flattened portion of the terminal so that the punched portions are concealed and protected.

The terminal may be applied to the foil at any desired position, so that when the condenser is rolled the terminal will project from any desired portion of the roll.

After the condenser has been rolled and is ready to be placed in its container, one or both of the terminals may, if desired, be insulated by slipping over the projecting portion of the aluminum wire any suitable tubular insulating material.

Referring to the drawing, the scale of which is exaggerated for clarity, like numerals refer to like parts throughout. In Fig. 1 a completed electrical terminal is depicted wherein an aluminum wire 10, flattened to provide a flat portion 11 is secured to an end of an aluminum foil 12 by punching. The foil 12 is then wrapped for one or more turns around the flattened portion 11 as shown, to provide folds in the foil 12 within one or more of which the flattened portion 11 is engaged.

In Fig. 2 the terminal wire 10 is secured to the foil 12 by providing one end of the foil with a fold 13 within which is engaged the flattened portion 11. The foil and flattened portion are then punched at 14—14 to provide a plurality of tongues 15—15 which are bent back upon the body of the fold 13 as depicted in Fig. 3. Thus clean metal to metal contact is formed between the terminal and the condenser foil which are securely held together by interfitting portions provided by the tongues 15—15 and the distorted edges of the various layers of metal along the margins of the apertures 14—14. A sectional view of the resultant structure is shown in Fig. 4. The securing means are then concealed and protected by wrapping the condenser foil one or more turns around the flattened portion 11 to form additional folds 16 and 17 as depicted in Figs. 5 and 6.

In Figs. 7, 8 and 9 a modified form of the punching is depicted. The condenser foil 12, provided with a fold 13 within which is engaged the flattened portion 11 of the terminal 10, is disposed between a pair of dies 18 and 19 as depicted. These dies are brought together to form an aperture 20 in the associated foil and flattened portion of the terminal wire. As shown in Figs. 8 and 9 the edges 21 of the upper layer of the foil 12 adjacent the hole 18 formed therein and the edge 22 of the flattened portion 11 adjacent the hole 18 formed therein are drawn through toward the other side, as shown, to form interfitting portions to secure the foil and flattened portion 11 together with clean metal to metal contact. A plurality of these punchings are formed across the width of the foil as indicated in Fig. 9. The foil is then wrapped for one or more turns around the flattened portion 11 as in the first modification.

In Fig. 10 is shown a condenser section 23 disposed in a container 24 of any suitable material such as cardboard, the space between the condenser section 23 and the container 24 preferably being filled with any suitable material such as pitch. The terminal wires 10, 10 project from the opposite ends of the section 23 through the ends of the container 24, and are surrounded by a section 25 of suitable tubular insulating material.

In accordance with the present invention a terminal is provided which is sufficiently strong to withstand rough handling and is securely fastened to the condenser foil within the rolled condenser section along the entire width of the foil, thus practically eliminating the danger of the terminal being torn loose from the condenser in handling. Efficient electrical connection is secured between the terminal and the foil and the direct metal to metal contact brought about by the punching operation eliminates any possibility of poor electrical connection due to film formation or the presence of foreign matter. The combination of securing means and the provision of one or more folds in the foil with the latter wrapped tightly about the terminal member provides the efficient and simple electrical and mechanical connection described which is more efficient than a connection provided by either securing means or folds alone. The likelihood of creepage of electrolyte between the terminal member and the adjacent folds of the foil with a possible consequent formation therebetween of a current blocking film and destruction of the electrical connection is avoided by the use of the securing means used in conjunction therewith. Being of the same material and at the same potential as the condenser plates, all difficulties due to corrosion in the presence of the electrolyte composition are eliminated. Likelihood of local corrosion defects and consequent terminal severance due to localized circulatory currents resulting in decrease in the concentration of the electrolyte composition and formation of salt crystals on a terminal adjacent the condenser section due to contact with air is reduced. Greater flexibility and clearance for condenser terminals inside containers are provided. Such a terminal can be more readily cleansed of electrolytic composition than can the usual projecting foil portion used as a terminal. By the use of such securing means for affixing the terminal to a foil the use of rivets, eyelets or other auxiliary securing means is avoided thus resulting in a saving of materials and labor. Other and further advantages are obvious.

Since certain changes may be made in the above article and different embodiments of the invention could be made without departing from the scope thereof, it is intended that all matter contained in the above description or shown in the accompanying drawing shall be interpreted as illustrative and not in a limiting sense.

Having described my invention, what I claim as new and desire to secure by Letters Patent, is:

1. A terminal for electrolytic condenser foils comprising a terminal member, a condenser foil wrapped directly around said terminal member to provide one or more folds in said foil and direct contact with said member engaged within one or more of said folds and means securing said member to said foil within the folded area of the latter.

2. A terminal for electrolytic condenser foils comprising a terminal member, a condenser foil wrapped directly around said terminal member to provide one or more folds in said foil and direct contact with said member engaged within one or more of said folds, and interfitting portions on said member and said foil within the folded area of the latter.

3. A terminal for electrolytic condenser foils comprising a terminal member having a flattened portion, a condenser foil wrapped directly around said terminal member to provide one or more folds in said foil and direct contact with said member engaged within one or more of said folds and means securing said member to said foil within the folded area of the latter.

4. A terminal for electrolytic condenser foils comprising a terminal member having a flattened portion, a condenser foil wrapped directly around said terminal member to provide one or more folds in said foil and direct contact with said member engaged within one or more of said folds, and interfitting portions on said flattened portion and said foil within the folded area of the latter to form a mechanical and electrical bond therebetween.

5. A terminal for electrolytic condenser foils comprising a terminal member having a flattened portion, a condenser foil wrapped directly around said terminal member to provide one or more folds in said foil and direct contact with said member engaged within one or more of said folds, said flattened portion and the adjacent folds of said foil being punched to form interfitting portions therebetween.

6. A terminal for electrolytic condenser foils comprising a flattened portion of an aluminum terminal wire, an aluminum condenser foil wrapped directly around said terminal wire to provide one or more folds in said foil and direct contact with said wire engaged within one or more of said folds, and means securing said flattened portion of said terminal wire to said foil within the folded area of the latter.

7. A terminal for electrolytic condenser foils comprising a flattened portion of an aluminum terminal wire, an aluminum condenser foil wrapped directly around said terminal wire to provide one or more folds in said foil and direct contact with said wire engaged within one or more of said folds, and interfitting portions on said flattened portion and said foil within the folded area of the latter formed by punching the assembled folds and flattened portion.

8. An electrical terminal for electrolytic condensers comprising an aluminum wire flattened at one end and extending across substantially the entire width of the condenser foil with the foil wrapped directly around the flattened portion to provide direct contact therebetween, said portion being secured in electrical and mechanical contact with said foil by punching.

9. In an electrolytic condenser, the combination comprising a terminal of aluminum wire flattened at one end, a condenser foil of aluminum, said flattened portion of said terminal extending a substantial distance in direct contact with the foil, secured in electrical and mechanical contact therewith by punching to form interfitting portions having direct contacting portions freed from insulating material by said punching.

10. In an electrolytic condenser, the combination comprising a condenser foil of aluminum and a terminal of aluminum wire flattened at one end and extending a substantial distance in contact with the foil, secured in electrical and mechanical contact therewith by punching, said foil being wrapped directly around the flattened portion to provide direct contact therebetween and to protect and conceal said securing means.

11. In an electrolytic condenser of the dry type, the combination comprising a condenser foil of film-forming metal and a wire terminal member flattened at one end and extending a substantial distance in contact with said foil and secured in direct electrical and mechanical contact therewith by punching to form interfitting portions having direct contacting portions freed from insulating material by said punching.

12. A dry electrolytic condenser terminal assembly comprising a condenser foil of film-forming metal, a wire terminal member of substantially the same metallurgical composition as said condenser foil and having a relatively smaller surface exposure per cubic unit, said wire having a flattened portion directly connected to said foil by punchings extending through said foil and said flattened portion of said wire to form interfitting portions having direct contacting portions freed from insulating material by said punching.

13. A terminal for dry electrolytic condenser foils comprising an elongate terminal strip having a flattened portion in contact with a condenser foil and a portion of reduced surface area and increased gage extending beyond said foil, and punchings directly to form interfitting portions having direct contacting portions freed from insulating material by said punching and to secure said flattened portion to said foil.

14. In a roll-type dry electrolytic condenser, the combination comprising a terminal formed of an elongate metal strip, a condenser foil of film-forming metal, said terminal strip extending a substantial distance in direct contact with said foil, secured in electrical and mechanical contact therewith by punching to form interfitting portions solely of the metal of said terminal strip and of said condenser foil having direct contacting portions of said terminal and foil metal freed from any insulating material by said punching.

HAL F. FRUTH.